United States Patent
Jakusovszky et al.

(10) Patent No.: US 9,918,186 B2
(45) Date of Patent: Mar. 13, 2018

(54) METHOD AND DEVICE FOR BLUETOOTH LOW POWER COMMUNICATION

(71) Applicant: EM Microelectronic-Marin SA, Marin (CH)

(72) Inventors: Mark Jakusovszky, Colorado Springs, CO (US); Marc Morin, Colorado Springs, CO (US); James Springer, Colorado Springs, CO (US)

(73) Assignee: EM Microelectronic-Marin SA, Marin (CH)

(*) Notice: Subject to any disclaimer, the term of this patent is extended or adjusted under 35 U.S.C. 154(b) by 0 days.

(21) Appl. No.: 14/974,168

(22) Filed: Dec. 18, 2015

(65) Prior Publication Data

US 2017/0180916 A1    Jun. 22, 2017

(51) Int. Cl.
| | |
|---|---|
| H04B 7/00 | (2006.01) |
| H04W 4/00 | (2018.01) |
| H04W 72/04 | (2009.01) |
| H04W 72/08 | (2009.01) |

(52) U.S. Cl.
CPC ......... *H04W 4/008* (2013.01); *H04W 4/005* (2013.01); *H04W 72/046* (2013.01); *H04W 72/085* (2013.01)

(58) Field of Classification Search
CPC ... H04W 4/008; H04W 4/005; H04W 72/046; H04W 72/085
USPC .............................................. 455/41.1–41.3
See application file for complete search history.

(56) References Cited

U.S. PATENT DOCUMENTS

| | | | |
|---|---|---|---|
| 2010/0302979 A1 | 12/2010 | Reunamaki | |
| 2013/0326495 A1* | 12/2013 | Reunamaki | G06F 8/65 717/173 |
| 2015/0304822 A1 | 10/2015 | Han et al. | |
| 2015/0304941 A1 | 10/2015 | Tapani et al. | |
| 2016/0132758 A1* | 5/2016 | Connolly | G06K 17/0022 235/375 |

(Continued)

FOREIGN PATENT DOCUMENTS

WO    WO 2015/068988 A1    5/2015

OTHER PUBLICATIONS

Galeev, Mikhail. Bluetooth 4.0: An introduction to Bluetooth Low Energy—Part I. EETimes. Jul. 14, 2011, pp. 1-5.*

(Continued)

*Primary Examiner* — Nay A Maun
*Assistant Examiner* — Angelica M Perez
(74) *Attorney, Agent, or Firm* — Oblon, McClelland, Maier & Neustadt, L.L.P.

(57) ABSTRACT

A method for transmitting a beacon message, the method generating, with a beacon generating device at least one beacon message, wherein the at least one beacon message is defined by a beacon message format, wherein the beacon message format comprises a preamble field, an access address field, a protocol data unit (PDU) field and a cyclic redundancy check (CRC) field, wherein the PDU field comprises at least one electronic product code (EPC) encoded EPC-PDU field, and transmitting, with the beacon generating device, the at least one beacon message using a Bluetooth Low Energy (BLE) wireless communication protocol to a transmission area within a transmission range of the beacon generating device for reception by one or more beacon receiving devices located in the transmission area.

16 Claims, 3 Drawing Sheets

(56) References Cited

U.S. PATENT DOCUMENTS

2016/0205496 A1* 7/2016 Su .......................... H04W 4/06
455/41.1
2016/0278006 A1 9/2016 Lee et al.

OTHER PUBLICATIONS

Office Action dated Apr. 5, 2017, in Europe Patent Application No. 16200844.5-1875. (8 pages).

* cited by examiner

Fig. 5

METHOD AND DEVICE FOR BLUETOOTH LOW POWER COMMUNICATION

TECHNICAL FIELD

The present invention relates to the field of wireless communication between wireless communication devices. In particular the invention relates to a method, to a system as well as to a computer program for Bluetooth low energy communication and/or data transmission.

BACKGROUND OF THE INVENTION

Bluetooth low energy (BLE) is a wireless personal area network technology designed and marketed by the Bluetooth Special Interest Group aimed at novel applications, in particular in the fields of healthcare, fitness, security and home entertainment. Compared to 'classic or conventional Bluetooth' BLE is intended to provide considerably reduced power consumption and cost while maintaining a similar communication range.

With classical BLE systems at least a pair of BLE devices, one of which denoted as a peripheral and the other one of which denoted as a hub, are operable to establish a communication link. Typically, the peripheral device advertises or broadcasts while the hub scans. Once the hub identifies a suitable peripheral device it requests a connection, pairs with the peripheral device and takes control over the peripheral device. At that time, the peripheral device stops advertising and communication becomes 'closed' so that communication is solely established between the hub and the peripheral device. For implementation of such a standard method, a complete BLE stack of hardware must be implemented for both BLE devices. In addition, once the communication between the pair of BLE devices has been established the communication takes place point-to-point. It is only visible to the hub and to the connected peripheral device.

Radio-frequency identification (RFID) is another wireless standard to use electromagnetic fields to transfer data, especially for the purpose of automatically identifying and tracking tags attached to objects. RFID-based communication is widely used for different application purposes. RFID tags have been attached to cash, clothing and/or possessions. It is even conceivable that RFID tags are implanted in animals or persons. There are basically two standard development organizations ISO/IEC JTC 1 and GS1/EPCglobal that define the vast majority of RFID data standards used globally. One example is the electronic product code (EPC) tag data standard which is used to encode passive RFID tags with data for logistics purposes in the retail supply chain. EPC-encoded RFID tags are inexpensive but suffer from comparatively short communication ranges and require the retailer to make a significant investment in dedicated reader hardware and software.

OBJECTS OF THE INVENTION

It is therefore an object of the present invention to provide a method for transmitting a beacon message as well as to provide a method for receiving a beacon message. It is a further object to provide a mobile computing device and a computer readable storage medium with executable instructions that provide improvements to BLE-based communications with a minimum on hardware or software modifications or implementations. It is another aim to provide not only point-to-point communication between BLE peripherals and BLE hubs but to enable BLE-based communication between a single hub with multiple peripherals and/or to provide communication between multiple peripherals and a single hub concurrently. It is another aim to make use of existing communication and encoding standards so that efforts for hardware and/or software modifications or implementations can be kept on a minimum level

SUMMARY OF THE INVENTION

In a first aspect a method for transmitting a beacon message is provided. The method comprises generating, with a beacon generating device, at least one beacon message. The beacon message is defined by a beacon message format. The well-defined beacon message format comprises a preamble field, an access address field, a protocol data unit (PDU) field and a cyclic redundancy check (CRC) field. Furthermore, the PDU field comprises at least one electronic product code (EPC) encoded EPC-PDU field. The method is based on this particular beacon message format and further comprises transmitting, with the beacon generating device, the at least one beacon message using a Bluetooth low energy (BLE) wireless communication protocol to a transmission area within a transmission range of the beacon generating device for reception by one or more beacon receiving devices located in the transmission area.

Compared to prior art solutions, the claimed method defines a particular beacon message format having a rather conventional preamble field, a rather conventional access address field and a rather conventional CRC field but which has a modified PDU field, which is provided with EPC-encoded data. In this way, the beacon message format is used as a physical transmitter for EPC-encoded data, which is widely known and implemented in accordance to the above mentioned global standards. In this way, hardware configured for Bluetooth low energy communication can emulate an RFID-based communication between two electronic devices.

In other words, the beacon generating device can emulate a RFID tag and/or a RFID reader. Since BLE hardware components provide a larger communication range compared to RFID hardware components, the limited spatial range of RFID-based hardware can be extended, simply by emulating RFID messages on the basis of Bluetooth low energy beacons. The RFID emulation on the basis of BLE-beacon communication will become rather attractive for end users, since the RFID emulating BLE-beacon communication can be implemented on the basis of available hardware components, such like BLE hubs and BLE peripherals. Investments towards rather expensive and separate RFID hardware and software can be saved. The level of acceptance for retailers to set up RFID emulating BLE-based communication within a retail store can be significantly enhanced since the RFID emulation is implementable without any significant hardware costs.

Generally and by using BLE Advertised Mode Communications, each RFID emulating BLE device can be configured as a beacon generating and/or as a beacon transmitting device. Such a device can be detected by multiple customers, simultaneously, each of which making use of a corresponding beacon receiving device. In addition to that, even multiple RFID emulating beacon generating devices might become visible concurrently. To mitigate the expected additional expense of RFID emulating beacon generating devices, such devices can be re-programmed and re-deployed onto new items, e.g. at a point of sale. It is furthermore conceivable that for more expensive items, the RFID emulating beacon generating device has a memory that could be written to by a beacon receiving device. Hence, beacon generating device and beacon receiving devices may swap roles. Data stored in any of a beacon generating device and a beacon receiving device can be arbitrarily modified by way of generating, transmitting, receiving and processing respective RFID emulating beacon messages.

In an end user scenario it is conceivable, that a beacon generating device or a beacon receiving device attached to an item can be re-programmed in order to indicate that the respective item has been purchased.

It is an additional benefit in that both, retailers and customers will be able to read and/or to write information provided by a beacon generating or beacon receiving device using only a BLE peripheral, such like a smart device and an application, e.g. denoted as APP. Smaller retailers will be able to monitor inventory levels, potentially at a whole store level from a single location, e.g. the main cash register. Customers will be able to determine if the retailer has a specific item in stock. The same APP could serve as a loss-prevention tool as well, in that, once a beacon generating or beacon receiving device attached to an item can no longer be read. This could be presumed that the respective item was either purchased or stolen. Stolen items could be found by using the app and the smart device outside the store. The software application, hence the APP, would also be able to provide customers with additional information and/or incentives directly.

The RFID emulating beacon messages further allow items that would traditionally be monitored by a dedicated RFID system to be monitored by both, the retailer and optionally by the customer at longer spatial ranges and with readily available hardware, namely a smart device, such like a smartphone, a tablet computer and with a respective APP.

According to another embodiment of the method for transmitting a beacon message, the PDU field comprises the EPC-PDU field and a BLE-encoded header field. The header field typically comprises various fields in accordance to the BLE standard. Typically, the header field is a 16-bit header while the EPC-PDU field is of variable size and comprises a payload. The header typically comprises a PDU type field indicating the PDU type. The header further comprises a length field indicating the length of the payload. Furthermore, the header typically comprises fields such like a TxAdd field and a RxAdd field and a RFU field that are commonly known in the BLE standard and are not further described herein.

In another embodiment the EPC-PDU field comprises an AdvAddress field and a EPC-PDU data field. The EPC-PDU data field comprises the EPC-encoded data. Typically, the EPC-PDU data field consists of EPC-encoded data. It is hence at least the EPC-PDU data field which exclusively comprises or consists of EPC-encoded data. The AdvAddress field may contain BLE encoded data or commands.

According to another embodiment, the AdvAddress field comprises a unique vendor address field and a unique beacon address field. Each one of these fields may comprise three octets. The vendor address field and the unique beacon address field may be BLE-encoded so that the BLE hardware components correctly address and identify the respective beacon message.

In another embodiment, the EPC-PDU data field comprises at least one EPC header field and an EPC payload field. The EPC-encoded header field is encoded in accordance to the EPC standard. The EPC header field provides various data and information with regard to the EPC-encoded payload of the beacon message.

In a further embodiment, the EPC header field comprises at least one or several of an AD length field, an AD type field, a message information field, a packet information field, a message number field, a data encoding field, a power level field and a battery info field. Each one of these fields is indicative of the content, the length or the particular function of the payload field. For instance, the AD length field may be indicative whether the present beacon message is a multi-packet message or a short message. The AD length field, typically having a length of one octet may represent a multi-packet message indicator, a short message indicator and/or a data encoding value.

The AD type field, typically having a length of one octet, may comprise or provide a unique advertising packet type. Hence, the AD type field may indicate a particular type of the advertising packet. The AD type field could be adopted in future Bluetooth standard definitions. It could be also included in a header field. Alternatively, it could be dropped in the PDU.

The message information field may identify whether a message is a single message or a packet of a multi-packet message. Furthermore, the message information field may identify intervals between consecutive packets. The message information fields may comprise one octet. A bit 7 may act as a multi-packet message indicator. A 0 may identify a single packet message and a 1 may identify a multi-packet message. Bit 6 may be used as a short message number indicator. A 0 may indicate a long, 4 byte message number and a 1 may indicate a short 1 byte message number. Bits 5-1 may represent nominal intervals between messages and bit 0 may represent a message interval time multiple. A 0 may represent 50 milliseconds and a 1 may represent ten seconds for instance. Hence, a fast beacon message interval may range from 50 milliseconds to 1.55 seconds. A slow beacon message interval may range from 10 seconds to 5 minutes and 10 seconds. It is also conceivable to implement a variable message interval time.

The packet information field typically only exists for multi-packet messages. It may comprise one octet. Here, bits 7-5 may represent unsigned integer values for a number of packets in message. Bits 4-2 may represent unsigned integer values for packet numbers. Bit 1 may identify a message authentication code indicator (MAC). Here, a 0 may represent that MAC is not included in packet message and 1 may indicate that MAC is actually included in the packet message. Bit 0 may represent a packet interval time. Here, a 0 may represent a cyclic interval time, hence one packet at every message interval time. A 1 may represent a burst, i.e. all packets, every message interval time with smaller than 10 milliseconds interval between packets. Typically, the MAC size is 4 bytes, when there are 1-4 packets in the message and the MAC size is 2 bytes, when there are 5-8 packets in the message. The MAC is always at the end of the PDU.

The message number field may contain 1-4 octets. It provides and allows for communications longer than one beacon event without requiring that the beacon generating/transmitting and the beacon receiving devices get into the connected mode.

The data encoding field, typically comprising one octet, represents a data encoding. Here, a bit 7 may act as a power level indicator. A 0 may represent that a power level is not included in the message and a 1 may represent that a power level is in fact included. Bit 6 may represent an estimated battery life indicator. A 0 may represent that the estimated battery life is not included in the message and a 1 may represent that the estimated battery life is in fact included. Bits 5-0 may represent various data encoding values. The data encoding values may range from 0-63. For instance, values 0x0020x23 may be taken from NFC and may use UTF-8 encoding. Examples for the encoding values may be the following:

The power level field, typically comprising one octet may comprise various bits to identify the beacon message's output power level to allow for changes in output power or output range and to provide support in beacon location. Here, the bits 7-2 may represent 2's complement value for beacon's TX output power. The range may be from 100001 (−31 dBm) to 011111 (+31 dBm) whereas 100000 represents unknown. Bit 1 may represent TX output power accuracy. Here, a 0 may represent typically ±1 dB or better and 1 may represent typically ±3 dB or better but 0 may represent a variable power indicator. Here, a 0 may indicate that a beacon uses a fixed output power level and a 1 may represent that a beacon uses variable output power levels. Here it has to be noted, that the power level value is the same for all packets in a message.

The battery info field may be used to provide a user warning that a battery needs to be replaced. The battery info field, typically comprising one octet, may represent the estimated battery life in percent. It may represent a two-digit BCD integer number. 4 MSB may indicate the tens digit and 4 LSB may indicate the ones digit. Also here it has to be noted, that an estimated battery life value is the same for all packets in a message.

There are generally also other implementations of the encoding value conceivable. The above given listing is only one of a plurality of examples and is hence non-limiting to the present invention.

In another aspect, the invention is also related to a method for receiving a beacon message. The method for receiving a beacon message corresponds to the method for transmitting a beacon message. The method for receiving the beacon message comprises receiving, with a beacon receiving device, at least one beacon message transmitted in a Bluetooth low energy wireless low energy protocol. The at least one beacon message is defined as described above. The beacon message is hence defined by a beacon message format. The beacon message format comprises a preamble field, an access address field, a PDU field and a CRC field. Also here, the PDU field comprises at least one EPC-PDU field containing information.

Based on the received beacon message, the method further comprises the step of performing at least one action based at least in part on the information of the EPC-PDU field. There are different types of actions conceivable. Performing of at least one action may include generating a reply beacon message in response to receive the beacon message. It may further include to re-write or to re-program a storage of a beacon receiving device. It may include modifying the future behavior of the beacon receiving device, e.g. in terms of power saving and beacon transmitting or beacon listening behavior. Generally, there is an unlimited number of programmable actions to be performed by the beacon receiving device in response to receive and to process a beacon message which is transmitted via a BLE physical link but which is provided with EPC, hence RFID encoded data so as to emulate an RFID encoded message.

According to a further embodiment of the beacon receiving method, a beacon message transmitted from a beacon generating device is received and processed concurrently by at least two or more separate beacon receiving devices. Hence, several beacon receiving devices, such like BLE peripherals, may listen and may process an undirected beacon message concurrently and hence simultaneously. In this way, information transmitted from a single beacon generating device can be processed by a multiplicity, even by hundreds of peripherals or beacon receiving devices.

In a further embodiment, a beacon receiving device receives and processes two or more beacon messages from different beacon generating devices concurrently. Based on the RFID emulating beacon message format, the beacon receiving device is enabled to process two or more, even hundreds of beacon messages from different beacon generating devices simultaneously and concurrently. In this way, an entirety of a whole stock in a retail shop can be detected and processed by a single beacon receiving device, such like a mobile computing device, e.g. implemented as a smartphone or tablet computer.

In another embodiment, a reply beacon message is transmitted from the beacon receiving device to the beacon generating device. Then, the reply beacon message is received and processed by the beacon generating device to change at least one field of future beacon messages to be generated by the beacon generating device. In this way, a bidirectional communication link between a beacon generating device and a beacon receiving device can be established. The RFID emulating beacon message format further allows to modify at least one field of future beacon messages generated by a beacon generating device. If for instance the beacon generating device is used as a tag attached to a sales item the communication on the basis of the beacon message and the reply beacon message may serve to modify the original beacon message so that future beacon messages transmitted from the beacon generating device indicate to other beacon receiving devices that the item is actually sold.

In another aspect, the invention also relates to a mobile computing device configured as a beacon generating device and/or configured as a beacon receiving device. The mobile computing device is configured to transmit, to receive and/or to process at least one beacon message transmitted via a Bluetooth low energy protocol. The at least one beacon message is defined by a beacon message format as described above. The beacon message format comprises a preamble field, an access address field, a PDU field and a CRC field. As already described above, the PDU field comprises at least one EPC-encoded EPC-PDU field. So the mobile computing device is configured or programmed to generate, to transmit, to receive and/or to process such RFID emulating BLE-based beacon messaged.

For this and according to another embodiment, the mobile computing device comprises at least a storage, a transceiver to receive and/or to transmit a beacon message and a processor to process a received beacon message and to perform at least one action based at least in part on the information of the EPC-PDU field.

The mobile computing device may be configured as a smart device, such like a smartphone, a smart computer, e.g. a tablet computer or as a personal computer or the like.

In another embodiment, the mobile computing device further comprises at least one sensor, wherein the at least one sensor is one of an acceleration sensor to detect a movement or an acceleration of the mobile computing device, a temperature sensor to detect a temperature or a change of the temperature in the vicinity of the mobile computing device, an optical sensor to detect a level of brightness in the vicinity of the mobile computing device and a humidity sensor to detect a level of humidity in the vicinity of the mobile computing device.

The mobile computing device is further configured to modify at least one of the generation or transmission of the beacon message in response to an output of the at least one sensor. The signals received by at least one of the above mentioned sensors may trigger a transmission of a beacon message. They may also trigger a listening period for which the beacon receiving device actually listens to potential beacon messages. By means of a temperature sensor, e.g. implemented as an infrared radiation detection sensor, the vicinity of a person could be detected.

The signals of an acceleration sensor may be used to trigger transmission of a beacon message only or at least when the mobile computing device, hence the RFID emulating tag attached to an item is subject to a movement. Similarly, a level of brightness in the environment or the vicinity of the mobile computing device may trigger transmission of one or a series of beacon messages. Likewise, a humidity sensor may trigger transmission of various beacon messages that could be used as an alert to indicate that the electronic device is exposed to an inadmissible degree of humidity.

Implementation of at least one sensor may help to reduce energy consumption of the mobile computing device. So per default, the mobile computing device could be set in an idle mode, in which a time interval between transmission of beacon messages is rather large. Alternatively, generation and transmission of beacon messages could be simply suppressed in the idle mode, in order to save energy and to prolong battery lifetime. As soon as the mobile computing device or an item to which said device is attached to is subject to a movement generation and/or transmission of at least one or a series of beacon messages can be triggered with the help of the at least one sensor.

Furthermore and according to another embodiment, the mobile computing device is generally configured to conduct one or several of the above mentioned methods. The mobile computing device is generally applicable to emulate generation, transmission, reception and processing of RFID or EPC-encoded messages or data.

In a further aspect, the invention also relates to a computer-readable storage medium that comprises executable-instructions to generate, with a beacon generating device at least one beacon message, wherein the at least one beacon message is defined by a beacon message format as described above. So the beacon message format comprises a preamble field, an access address field, a PDU field and a CRC field. The PDU field comprises at least one electronic product code (EPC-encoded EPC-PDU field). The executable instructions are further configured to transmit, with the beacon generating device, the at least one beacon message using a Bluetooth low energy wireless communication protocol to a transmission area within a transmission range of the beacon generating device for reception by one or more beacon receiving devices located in the transmission area. The executable instructions are further configured to receive, with a beacon receiving device at least one beacon message transmitted in a Bluetooth low energy wireless communication protocol and the executable instructions are further configured to perform at least one action based at least in part on the information of the EPC-PDU field.

It is generally to be mentioned, that any features, functions, benefits and effects as described above in connection with any one of the methods, the mobile computing device and the computer readable storage medium equally apply to all other embodiments and aspects of the invention. For instance, features and benefits described in connection with the above mentioned methods equally apply to the mobile computing device and the computer-readable storage medium and the executable-instructions stored thereon; and vice versa.

BRIEF DESCRIPTION OF THE DRAWINGS

In the following, a non-limiting example of an implementation of the present invention is described in the following detailed description by making reference to the figures, in which.

DETAILED DESCRIPTION OF THE INVENTION

Bluetooth Low Energy (BLE) is an exemplary wireless communication protocol that can be used to transmit beacon messages as described herein with low energy cost. The BLE specification ("BLE Specification") is defined in Volume 6 of the Bluetooth Specification Version 4.0, published Jun. 30, 2010. The BLE system uses short wavelength radio transmissions in the 2.4 GHz ISM band at 2400-2483.5 MHz and uses 40 RF channels that are 2 MHz wide. BLE can use a radio technology called frequency-hopping spread spectrum, which chops up the data being sent and transmits chunks of it on across the different channels.

BLE transmissions can have a variable range, such as about 50 m, an over-the-air data rate of about 1 Mb/s, and a power consumption of about 1% to about 50% of that of Classis Bluetooth, depending on the application.

BLE comprises plural link layer states, including an advertising state. The link layer in the advertising state can transmit advertising channel packets and can optionally listen to and respond to responses triggered by these advertising channel packets. A BLE device in the advertising state is known as an advertiser.

In BLE, the 40 RF channels are allocated into two physical channels: an advertising channel and a data channel. The advertising physical channel uses three RF channels for discovering devices, initiating a connection and broadcasting data. The data physical channel uses up to 37 RF channels for communication between connected devices. The link layer uses one physical channel at a given time.

Figure 1:
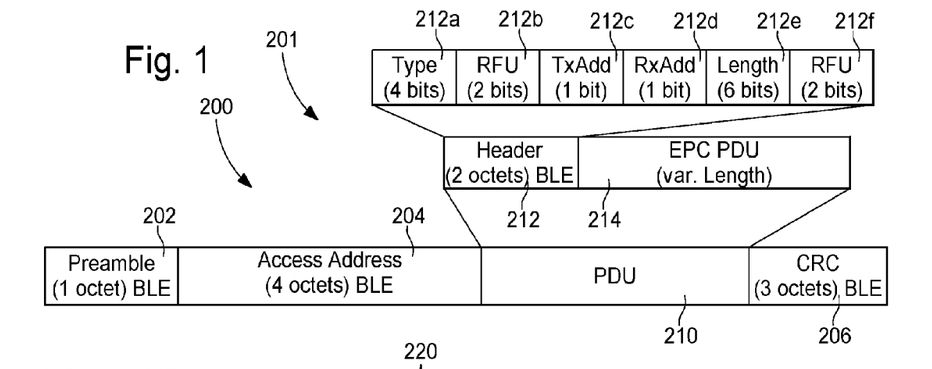
FIG. 1 schematically illustrates the beacon message format of a beacon message.

The BLE link layer has only one packet format used for both advertising channel packets and data channel packets. The packet format of a beacon message 200 is shown in FIG. 1. Each message packet consists of four fields: the preamble 202 field, the access address 204 field, the protocol data unit (PDU) field 210, and the cyclic redundancy check (CRC) field 206.

When a packet is transmitted in an advertising physical channel, the PDU is called the advertising channel PDU, and when a packet is transmitted in a data physical channel, the PDU is called the data channel PDU. The advertising channel PDU field 210 has a 16-bit or 2 octets header 212 and a variable size PDU field 214. The PDU type field 212*a* of the advertising channel PDU that is contained in the header 212 indicates the PDU type. There are currently 7 PDU types, some of which are discussed below. The length field 212e indicates the length of the payload or PDU 214 in octets. The valid range of the length field 212e is 6 to 37 octets. The RFU field 212b, TxAdd field 212c, RxAdd field 212d and RFU field 212f are not discussed herein.

The following advertising channel PDU types are used in the specified events:

ADV_IND: used in connectable undirected advertising events;

ADV_DIRECT_IND: used in connectable directed advertising events;

ADV_NONCONN_IND: used in non-connectable undirected advertising events;

ADV_SCAN_IND: used in scannable undirected advertising events. These PDU types are sent by the link layer in the advertising state.

The PDU types ADV_IND, ADV_NONCONN_IND and ADV_SCAN_IND are each used in "undirected" advertising events, meaning that a transmission is broadcast to no particular receiver, but can be received by any properly configured device within the transmission range of the sending device. The ADV_IND type can be used to establish a connection with one or more receiving device, whereas the ADV_NONCONN_IND type can be used for non-connectable, or one-way, communications to one or more receiving devices, and the ADV_SCAN_IND type can be used in scanning advertising events. The payload for all three of the PDU types ADV_IND, ADV_NONCONN_IND and ADV_SCAN_IND is the same.

Figure 2:
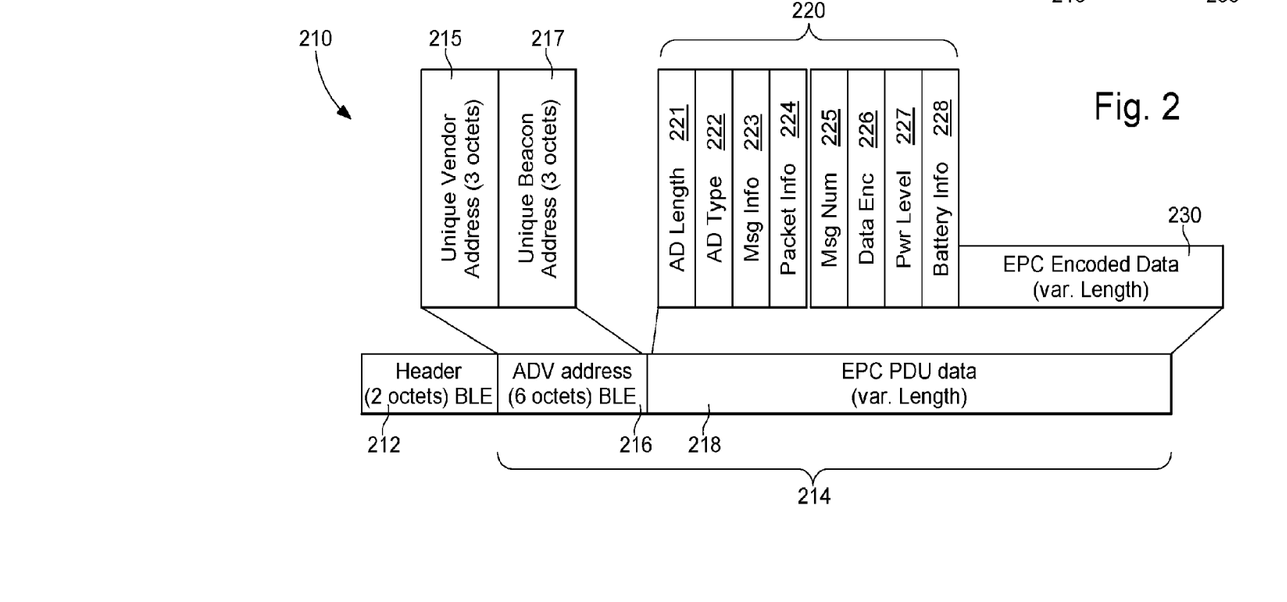
FIG. 2 schematically shows the structure of the PDU field of the beacon message format.

In FIG. 2, the PDU field 210 of the beacon message 200 is schematically illustrated. The PDU field 210 comprises a header 212 and an EPC-PDU field 214. The header 212 typically comprises two octets that are encoded in accordance to the BLE standard. The EPC-PDU field 214 comprises an AdvAddress field 216 and an EPC-PDU data field 218. The AdvAddress field 216 comprises a unique vendor address field 215 and a unique beacon address field 216. The unique vendor address field 215 and the unique beacon address field 217 may each comprise three octets.

The EPC-PDU data field 218 may split into an EPC header field 220 and an EPC payload field 230, the latter of which containing the EPC-encoded data. The EPC payload field 230 may be of variable length. The length but also other parameters of the EPC-encoded data stored in the EPC payload field 230 may be further specified and characterized by various fields of the header field 220. In the embodiment as shown in FIG. 2, the header field 220 comprises at least one or several of an AD length field 221, an AD type field 222, a message information field 223, a packet information field 224, a message number field 225, a data encoding field 226 a power level field 227 and a battery info field 228.

The functionality and usability of each of these fields is described above.

With the present beacon message format EPC-encoded data can be transmitted via a BLE communication link. A BLE physical link can therefore emulate RFID or EPC-encoded data transmission. Moreover, well-defined EPC-encoded information widely accepted and used can be embedded into a BLE physical link for which at least the communication hardware is readily available at moderate costs.

Figure 3:
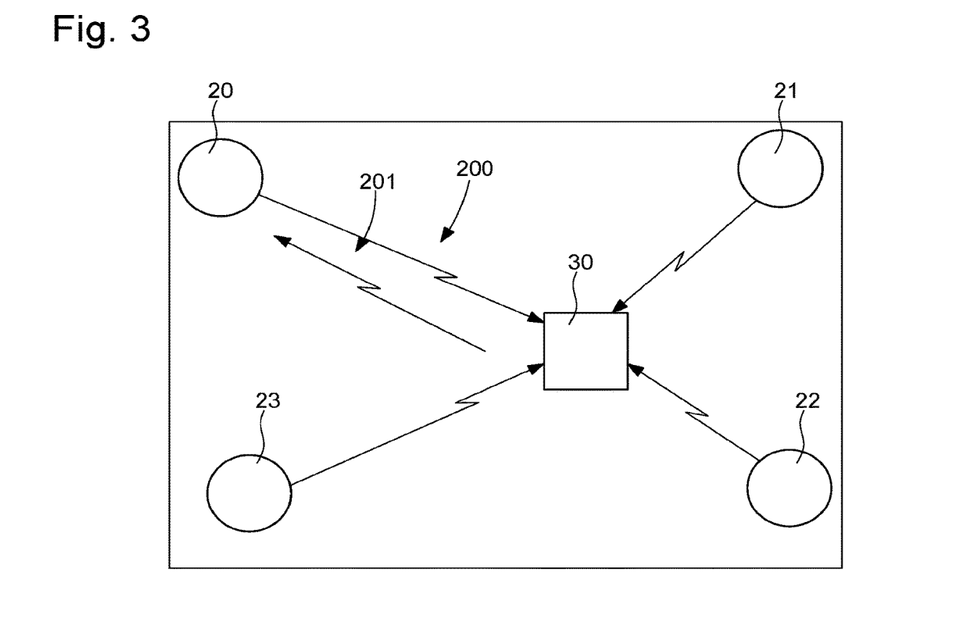
FIG. 3 shows a communication scenario wherein several beacon generating devices concurrently communicate with a single beacon receiving device, FIG. 4 schematically shows a situation wherein several beacon receiving devices concurrently receive one or several beacon messages from a single beacon generating device.

It is for instance conceivable, that various beacon generating devices 20, 21, 22, 23 each generate and transmit a separate beacon message 200 which is concurrently and simultaneously received by a single beacon receiving device 30 as illustrated in FIG. 3. Imagining that the beacon generating devices 20, 21, 22, 23 emulate or mimic a conventional RFID tag the tag information can be transmitted to the beacon receiving device 30, which may be implemented as a smart device or generally as a mobile computing device. In this way and simply based on BLE-based communication a user making use of the beacon receiving device 30 may be instantaneously provided with information about all the beacon generating devices 20, 21, 22, 23 that are within the transmission range.

Figure 4:
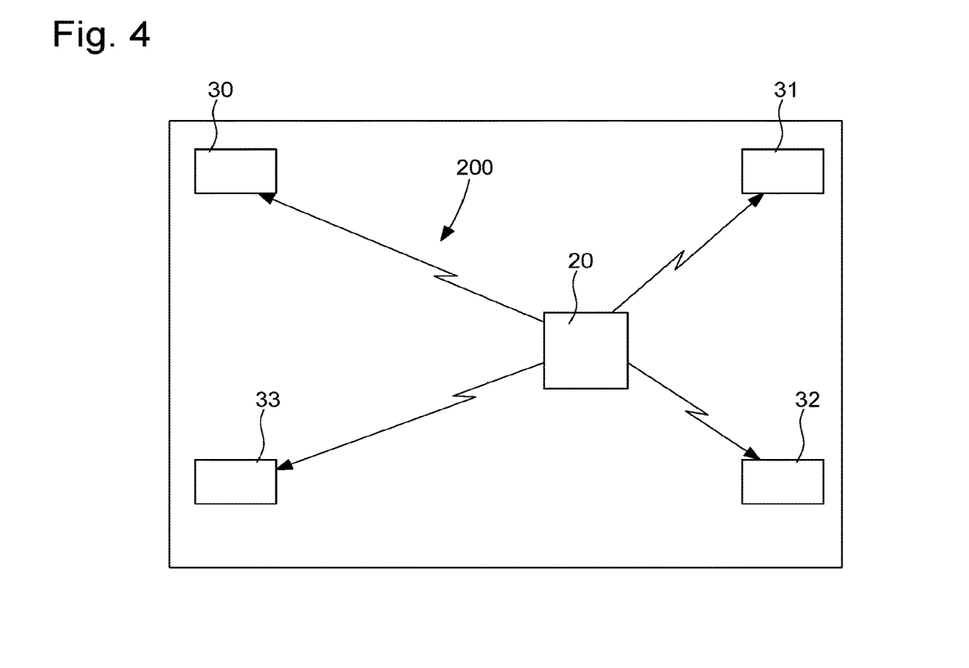

In another scenario as illustrated in FIG. 4, it is also conceivable, that a beacon generating device 20 simultaneously or concurrently communicates with a multiplicity of beacon receiving devices 30, 31, 32, 33. Here, the beacon generating device 20 may be also implemented as a mobile computing device, such like a smartphone. The beacon receiving devices 30, 31, 32, 33 that may be installed in a retail shop may receive and process a beacon message 200 transmitted from the beacon generating device 20.

As soon as a potential customer carrying the beacon generating device 20 approaches one of the beacon receiving devices 30, 31, 32, 33 the roles of beacon generating devices and beacon receiving devices may swap so that the devices 30, 31, 32, 33 generate and transmit a reply beacon message 201 towards the device 20, thereby informing the customer about a special offer for instance. Based on the RFID emulating beacon messages the functionality of the communication and interaction between various mobile computing devices can be enhanced.

For instance, each beacon generating device and be detected by multiple customers and by a retailer simultaneously. Even hundreds or thousands of beacon generating devices, such like RFID emulating BLE tags can be made visible concurrently. To mitigate the expected additional expense of such tags, they could be re-programmed and re-deployed onto new items at a point of sale. For expensive items, the memory of a mobile computing device can be written to by another mobile computing device to indicate that the respective item or product has e.g. been purchased. It may then allow the customer to register the product using the same smart device-based APP after the purchase has been completed.

Both, retailers and customers will be able to read and/or to modify the information stored in the mobile computing devices by only making use of a smart device, such like a smartphone and a respective software APP. Retailers will be able to monitor inventory levels, potentially at a whole-store level from a single location and customers will be able to determine if the retailer has a specific item in stock simply by making use of the mobile computing device and the above described method on the basis of RFID emulating BLE-beacon messages.

It is for instance conceivable, that a mobile computing device of a customer keeps a running list of unique packets received. In other words the mobile computing device of the customer may be automatically provided with an inventory list of the retail store when entering the respective store. The customer may filter this list for a particular packet attribute, such like product size. The mobile computing device could display information on a display based on a received beacon message. The mobile computing device could also respond to a beacon message and write to the memory of another mobile computing device to change the status of such a tag emulating mobile computing device. This may include changing shelf pricing and setting flags to indicate that a product has been sold.

The mobile computing device may be also configured to identify when a packet or a portion thereof has not been receive over a given time period.

The mobile computing device, hence the RFID emulating BLE tag may optionally contain a sensor providing an output that could act as a 'gate' for transmission of a beacon message or advertisement, thus conserving battery power and extending the useful life of the battery and hence of the mobile computing device.

Figure 5:
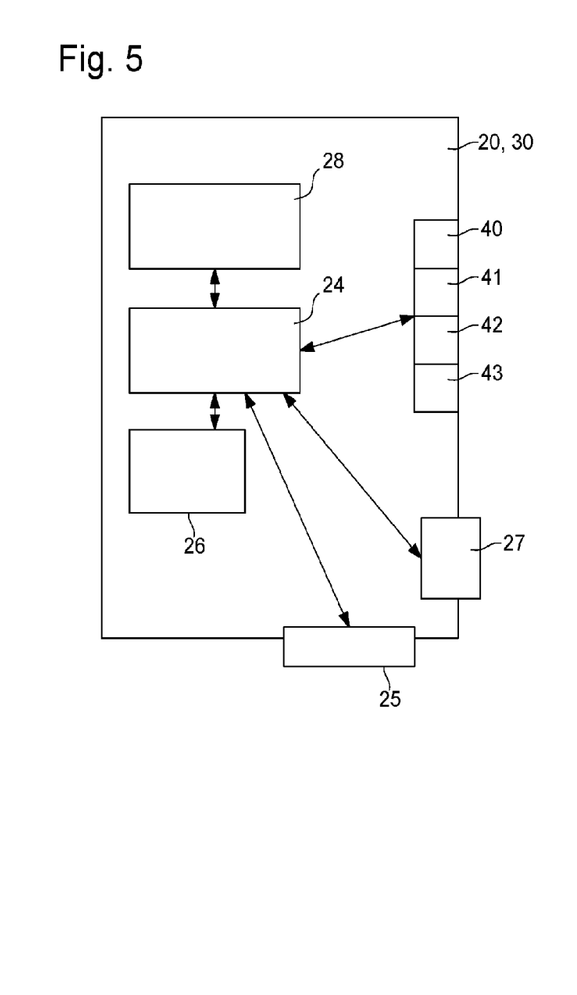
FIG. 5 is a block diagram of a mobile computing device to be used as a beacon generating device and/or as a beacon receiving device.

Typically, and as illustrated in FIG. 5, a mobile computing device 20 comprises a processor 24, a transceiver 28 and a storage 26. Furthermore or optionally the mobile computing device 20 may be provided with an input 25 and/or with a display 27. Further optionally, the mobile computing device 20 may comprise at least one of an acceleration sensor 40, a temperature sensor 41, an optical sensor 42 or a humidity sensor 43. The outputs of any one of these sensors may indicate that the mobile computing device 20 or an item to which said device is attached to is subject to a movement, subject to a raised or lowered temperature, subject to illumination or subject to a humid or wet environment.

The changes of the environment detectable by any of the above mentioned sensors 40, 41, 42, 43 may be used to trigger or to modify the processing or transmitting behavior of the mobile computing device 20, 30. Typically, the mobile computing device 20, 30 may be implemented as a beacon receiving device 30 or as a beacon generating device or both.

Figure 6:
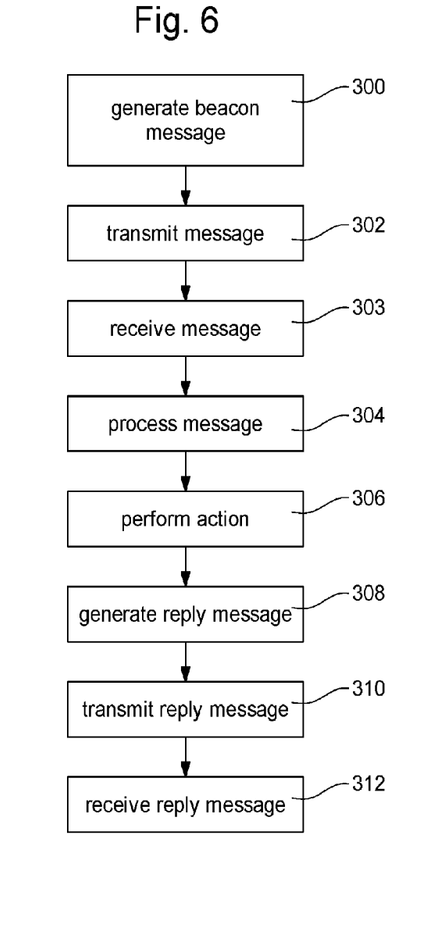
FIG. 6 is a flowchart of a method for generating and receiving a beacon message according to the present invention.

The flowchart according to FIG. 6 is indicative of basic features of the present method of transmitting and receiving of a beacon message. In a first step 300 the processor 24 of the mobile computing device 20 generates a beacon message 200 as described above. For instance, the beacon message 200 may be generated on the basis of data stored in the storage 26, which may be implemented as a non-volatile storage or memory. Thereafter in step 302 the beacon message 200 is transmitted wirelessly in accordance to a BLE wireless communication protocol to a transmission area within a transmission range of the beacon generating device 20.

Thereafter in step 303 the transmitted beacon message 200 is received by another mobile computing device 30, typically implemented or acting as a beacon receiving device 30. In step 304 the beacon receiving device 30 actually processes the received beacon message 200 and then performs an action in the subsequent step 306. Optionally the beacon receiving device 30 may swap role with the beacon generating device 20 and may then generate a reply beacon message 201 that is also transmitted wirelessly in accordance to the BLE wireless communication protocol to a transmission area within a transmission range of the respective device 30 in step 310.

Thereafter in step 312 the reply beacon message 201 may be received by the previous beacon generating device 20, now acting as a beacon receiving device and in the subsequent step 340 the received reply beacon message 201 will be processed by the initial beacon generating device 20. Optionally, the communication and the generation, transmission, reception and processing of various beacon messages may be repeated multiple times, e.g. depending on the parameters of the beacon message and the programming of mutually corresponding beacon generating devices 20, 21, 22, 23 and beacon receiving devices 30, 31, 32, 33.

What is claimed is:

1. A method for transmitting a beacon message, the method comprising:

generating, with a beacon generating device at least one beacon message, wherein the at least one beacon message is defined by a beacon message format, wherein the beacon message format comprises a preamble field, an access address field, a protocol data unit field and a cyclic redundancy check field, wherein the PDU field comprises at least one electronic product code encoded EPC-PDU field, and transmitting, with the beacon generating device, the at least one beacon message using a Bluetooth Low Energy wireless communication protocol to a transmission area within a transmission range of the beacon generating device for reception by one or more beacon receiving devices located in the transmission area, wherein the PDU field comprises the EPC-PDU field and a BLE-encoded header field, wherein the EPC-PDU field comprises an AdvAddress field and an EPC-PDU data field, and wherein the AdvAddress field comprises a unique vendor address field and a unique beacon address field.

2. The method according to claim 1, wherein the EPC-PDU data field comprises at least one EPC header field and an EPC payload field.

3. The method according to claim 2, wherein the EPC header field comprises at least one or several of:
   an AD length field,
   an AD type field,
   a message information field,
   a packet information field,
   a message number field,
   a data encoding field,
   a power level field,
   a battery info field.

4. The method according to claim 1, wherein the beacon message transmitted from the beacon generating device is received and processed concurrently by at least two or more separate beacon receiving devices.

5. The method according to claim 1, wherein a beacon receiving device receives and processes two or more beacon messages from different beacon generating devices concurrently.

6. The method according to claim 1, wherein a reply beacon message is transmitted from the beacon receiving device to the beacon generating device and wherein the reply beacon message is received and processed by the beacon generating device to change at least one field of future beacon messages to be generated by the beacon generating device.

7. The method according to claim 1, wherein BLE-encoded header field is a 16 bit header field.

8. The method according to claim 1, wherein each one of the unique vendor address field and the unique beacon address field comprises three octets.

9. A method for receiving a beacon message, the method comprising:

receiving, with a beacon receiving device at least one beacon message transmitted in a Bluetooth Low Energy wireless communication protocol, the at least one beacon message being defined by a beacon message format, wherein the beacon message format comprises a preamble field, an access address field, a protocol data unit field and a cyclic redundancy check field, wherein the PDU field comprises at least one electronic product code encoded EPC-PDU field containing an information, and performing at least one action based at least in part on the information of the EPC-PDU field, wherein the PDU field comprises the EPC-PDU field and a BLE-encoded header field, wherein the EPC-PDU field comprises an AdvAddress field and an EPC-PDU data field, and wherein the AdvAddress field comprises a unique vendor address field and a unique beacon address field.

10. The method according to claim 9, wherein the beacon message transmitted from a beacon generating device is received and processed concurrently by at least two or more separate beacon receiving devices.

11. The method according to claim 9, wherein the beacon receiving device receives and processes two or more beacon messages from different beacon generating devices concurrently.

12. The method according to claim 9, wherein a reply beacon message is transmitted from the beacon receiving device to the beacon generating device, and wherein the reply beacon message is received and processed by the beacon generating device to change at least one field of future beacon messages to be generated by the beacon generating device.

13. A mobile computing device configured as a beacon generating device and/or configured as a beacon receiving device, the mobile computing device being configured to transmit, to receive and/or to process at least one beacon message transmitted via a Bluetooth Low Energy protocol, wherein the at least one beacon message is defined by a beacon message format, wherein the beacon message format comprises a preamble field, an access address field, a protocol data unit field and a cyclic redundancy check field, and wherein the PDU field comprises at least one electronic product code encoded EPC-PDU field, and wherein the PDU field comprises the EPC-PDU field and a BLE-encoded header field, wherein the EPC-PDU field comprises an AdvAddress field and an EPC-PDU data field, and wherein the AdvAddress field comprises a unique vendor address field and a unique beacon address field.

14. The mobile computing device according to claim 13, comprising at least:

a storage, a transceiver to receive and/or to transmit a beacon message, and a processor to process a received beacon message and to perform at least one action based at least in part on the information of the EPC-PDU field.

15. The mobile computing device according to claim 13, further comprising at least one sensor, the at least one sensor being one of:

an acceleration sensor to detect a movement or an acceleration of the mobile computing device, a temperature sensor to detect a temperature or a change of the temperature in the vicinity of the mobile computing device, an optical sensor to detect a level of brightness in the vicinity of the mobile computing device, a humidity sensor to detect a level of humidity in the vicinity of the mobile computing device, and wherein the mobile computing device is configured to modify at least one of the generation or transmission of the beacon message in response to an output of the at least one sensor.

16. A non-transitory computer readable storage medium comprising executable instructions to:

generate, with a beacon generating device at least one beacon message, wherein the at least one beacon message is defined by a beacon message format, wherein the beacon message format comprises a preamble field, an access address field, a protocol data unit field and a cyclic redundancy check field, wherein the PDU field comprises at least one electronic product code encoded EPC-PDU field, and transmit, with the beacon generating device, the at least one beacon message using a Bluetooth Low Energy wireless communication protocol to a transmission area within a transmission range of the beacon generating device for reception by one or more beacon receiving devices located in the transmission area, receive, with a beacon receiving device at least one beacon message transmitted in a Bluetooth Low Energy wireless communication protocol, and perform at least one action based at least in part on the information of the EPC-PDU field, wherein the PDU field comprises the EPC-PDU field and a BLE-encoded header field, wherein the EPC-PDU field comprises an AdvAddress field and an EPC-PDU data field, and wherein the AdvAddress field comprises a unique vendor address field and a unique beacon address field.

* * * * *